April 29, 1952 — D. H. NOVAK — 2,594,676
AUTOMOBILE THEFT ALARM
Original Filed Aug. 12, 1949 — 2 SHEETS—SHEET 1

Inventor
DONALD H. NOVAK
By Patrick D. Beavers
Attorney

April 29, 1952      D. H. NOVAK      2,594,676
AUTOMOBILE THEFT ALARM
Original Filed Aug. 12, 1949      2 SHEETS—SHEET 2
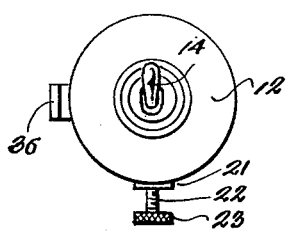
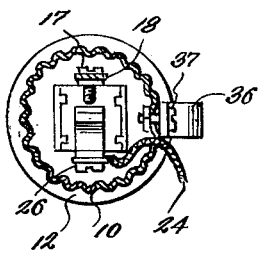
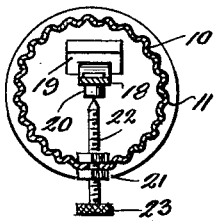
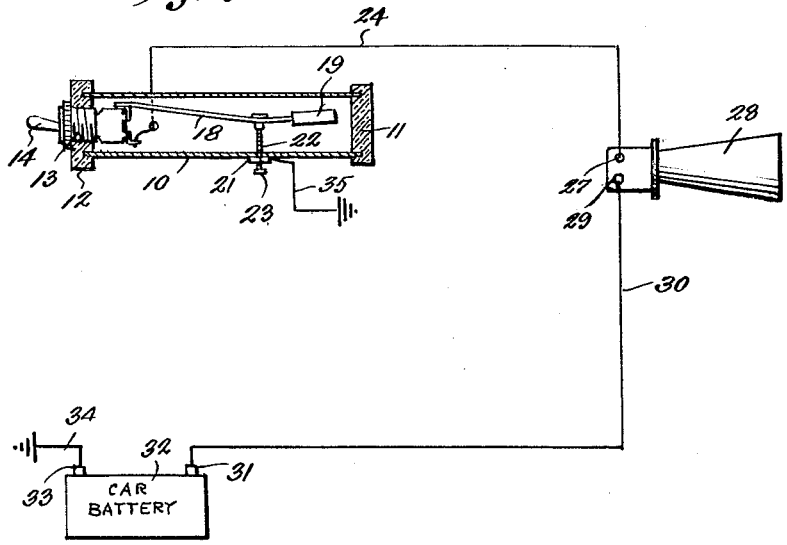
Inventor
DONALD H. NOVAK
By *Patrick D. Beavers*
Attorney Patented Apr. 29, 1952

2,594,676

UNITED STATES PATENT OFFICE 2,594,676

AUTOMOBILE THEFT ALARM

Donald H. Novak, Gary, Ind.

Continuation of application Serial No. 109,843, August 12, 1949. This application August 29, 1951, Serial No. 244,169.

2 Claims. (Cl. 200—52)

The present invention relates to automobile theft alarm and it consists in the combinations, constructions and arrangements of parts herein described and claimed.

This application is a continuation of the co-pending application Serial Number 109,843, filed August 12, 1949, now abandoned.

Generally there is provided an automobile theft alarm which comprises a housing in which is mounted an elongated contact member of spring metal having at its free end a weight. A second contact member is threadably and adjustably mounted in one side of the housing and is adapted to come into contact with the first mentioned contact member when an automobile in which the device may be mounted is jarred in any way such as, for example, the moving of the same by an entrance of a person therein or by the moving of the automobile along a road or street in ordinary traffic, such movement causing a vibration of the elongated contact member whereby the same will come into contact with the adjustably mounted contact member to complete an electrical circuit which includes the conventional horn or other signalling device of the vehicle.

It is an object of the invention to provide a device of the character set forth which is simple in construction and operation, easy to install, inexpensive to manufacture and yet effective and efficient in use.

Another object of the invention is the provision of a novel inertia-actuated switch.

A further object of the invention is the provision of novel means for adjusting a device of the character set forth.

A still further object of the invention is the provision of a device of the character set forth having means whereby the conventional signalling device of an automobile may be utilized as a theft alarm.

Other and further objects of the invention will become apparent from a reading of the following specification taken in conjunction with the drawings, in which:

Figure 4 is an end elevational view of Figure 1,

Figure 5 is a sectional view taken along line 5—5 of Figure 3,

Figure 6 is a sectional view taken along line 6—6 of Figure 3, and

Figure 7 is a view partly in section and partly schematic illustrating an electrical system utilized in connection with the invention.

Figure 1:
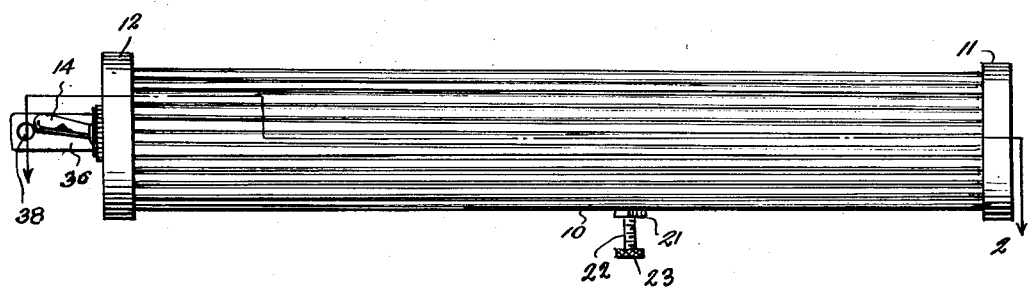
Figure 1 is a side elevational view of an embodiment of the invention.
Figure 2:
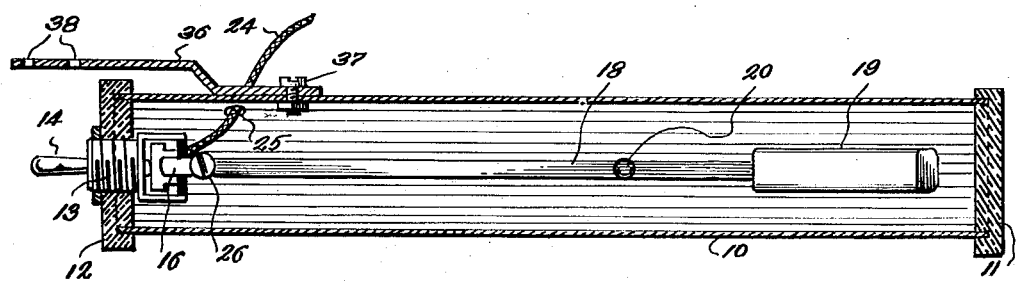
Figure 2 is a sectional view taken along line 2—2 of Figure 1.
Figure 3:
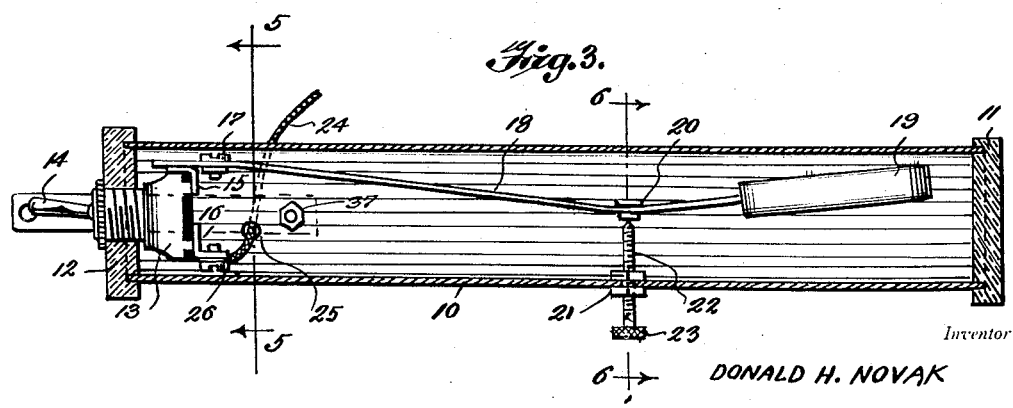
Figure 3 is a view similar to Figure 2 but taken at right angles thereto.

Referring more particularly to the drawings, there is shown therein a theft alarm comprising a housing having a cylindrical body 10 preferably formed of metal and having a front end 11 of dielectric material and a rear end 12 likewise formed of dielectric material.

A conventional switch mechanism 13 extends through the end 12 of the housing and is provided with a switch arm 14 and a pair of terminals 15 and 16. To the terminal 15 there is affixed by means of a screw 17 or other means an elongated arm 18 of spring metal which has mounted at its free end a weight 19 and, inwardly of the weight 19, a contact member 20.

A fitting 21 is mounted in one side of the casing 10 and has threadably mounted therein a contact member 22 provided with an operating handle 23 at its outer end. It will be seen that the contact member 22 is adapted to come into physical contact with the member 20 when the arm 18 is vibrated.

A lead wire 24 extends through an opening 25 in one side of the housing 10 and is connected by means of a screw 26 or the like to the terminal 16 of the switch mechanism 13. The lead wire 24 is connected at its other end to one terminal 27 of a conventional horn 28 whose other terminal 29 has connected thereto one end of a lead wire 30 the other end of which is connected with one terminal 31 of a battery 32. The other terminal 33 of the battery 32 is connected by means of a lead wire 34 to a grounding point upon the vehicle and, likewise, the fitting 21 is connected by means of a lead wire 35 to a grounding point upon the vehicle.

In operation, it will be apparent that the device may be mounted at any convenient position within a vehicle by means of a bracket 36 fastened by means of a bolt 37 to one side of the housing 10. The bracket 36 is provided with holes 38 whereby the same may be screwed or bolted to the vehicle. When the device is so mounted, and its lead wires are connected as shown in Figure 7 of the drawings, the switch mechanism is put in closed condition by means of the handle 14 and the vehicle may then be locked with the assurance that any unauthorized movement of the vehicle will cause the weight 19, acting through inertia, to vibrate. The arm 18 thereby causing repeated contact between the contact members 20 and 22 thus completing a circuit which includes the horn 28 and the battery 32 thereby sounding an alarm. If it is desired to have the device actuate only when severe shocks are imparted thereto, then the contact member 22 will be withdrawn a certain distance by means of the handle 23. Again, to render the device more sensitive it is only necessary to move the contact member 22 into closer normal distance from the contact member 20 whereby when only slight shocks are imparted to the vehicle the action heretofore described will take place.

While but one form of the invention has been shown and described herein, it will be readily apparent to those skilled in the art that many minor modifications may be made without departing from the spirit of the invention or the scope of the appended claims.

What is claimed is:

1. A control device for a signal comprising an elongated casing having an open end, an insulator closing said open end, a hole provided in the insulator, a switch comprising a housing, means extending through the hole for securing the housing in the casing, a switchback of insulating material carried by the housing, a pair of terminals mounted on the switchback, bridge means in the housing for engaging the terminals, means for operating the bridge means, elongated flexible means mounted on one of said terminals and extending longitudinally in the casing, a weight secured to the free end of the flexible means and a contact carried by the casing for engagement with said flexible means.

2. A control device for a signal comprising an elongated metal casing having an open end, a bracket secured to the casing for attaching the device to a mounting, an insulator closing said open end, a hole provided in the insulator, a switch comprising a housing, means extending through the hole and means connected to the extending means for securing the housing in the casing, a switchback of insulating material carried by the housing, a pair of terminals mounted on the switchback, bridge means in the housing for engaging the terminals, means for operating the bridge means, elongated metal flexible means detachably mounted on one of said terminals and extending longitudinally in the casing, a weight secured to the free end of the flexible means, contact means carried by the flexible means, an adjustable contact carried by the casing for engagement with the contact means on said flexible means, and a conductor wire connected to the other of said terminals.

DONALD H. NOVAK.

REFERENCES CITED

The following references are of record in the file of this patent:

UNITED STATES PATENTS

| Number | Name | Date |
|---|---|---|
| 1,837,140 | Thew | Dec. 15, 1931 |
| 1,846,966 | Hausse | Feb. 23, 1932 |
| 1,891,493 | Apostoloff | Dec. 20, 1932 |